(No Model.)
A. A. HOUGHTON & R. D. HAINES.
PROCESS OF PLATING CLAY WITH GLASS AND IN ARTICLES MADE ACCORDINGLY.
No. 479,365. Patented July 19, 1892.
Fig. I.
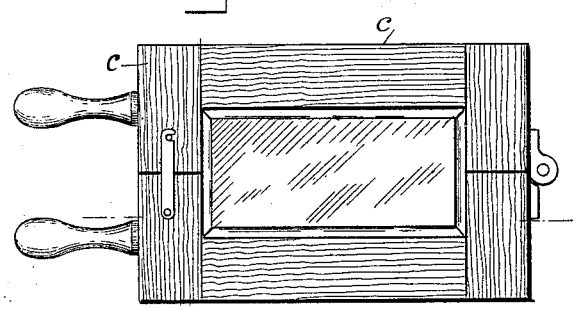
Fig. III.
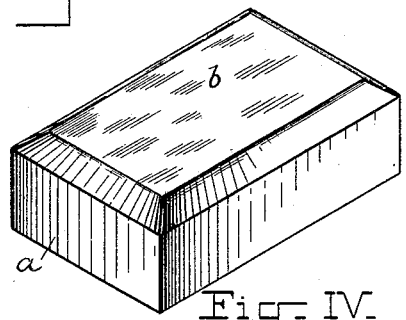
Fig. II.
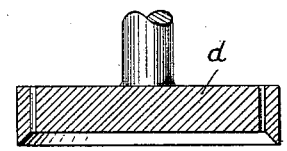
Fig. IV.
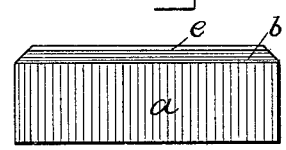
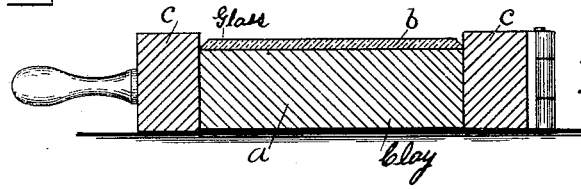
Fig. V.
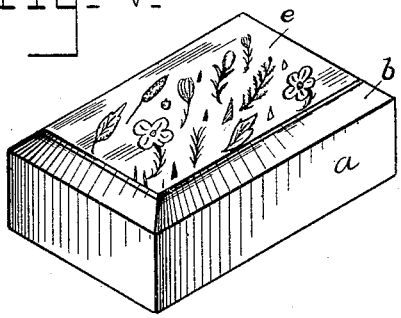
Fig. VI.
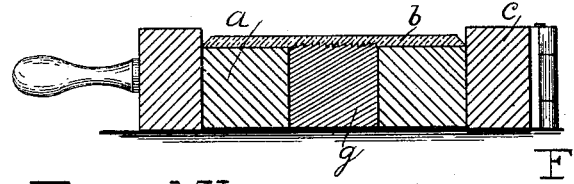
Fig. VII.
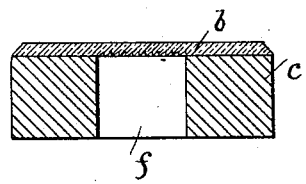
Fig. VIII.
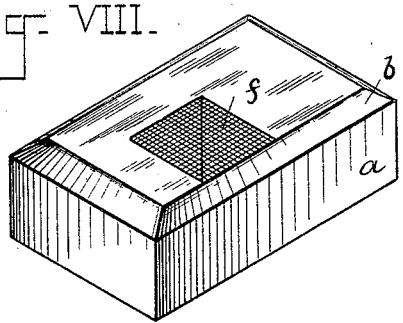
Witnesses
Lillie Hanna
M. E. Bidgood
Inventors
Arthur A. Houghton
Robert D. Haines

UNITED STATES PATENT OFFICE.

ARTHUR A. HOUGHTON AND ROBERT D. HAINES, OF CORNING, NEW YORK, ASSIGNORS, BY DIRECT AND MESNE ASSIGNMENTS, TO THE CLAY GLASS TILE COMPANY, OF SAME PLACE.

PROCESS OF PLATING CLAY WITH GLASS AND IN ARTICLES MADE ACCORDINGLY.

SPECIFICATION forming part of Letters Patent No. 479,365, dated July 19, 1892.

Application filed October 15, 1891. Serial No. 408,783. (No model.)

*To all whom it may concern:*

Be it known that we, ARTHUR A. HOUGHTON and ROBERT D. HAINES, citizens of the United States, residing at Corning, in the county of Steuben, in the State of New York, have invented certain new and useful Improvements in Processes of Plating Clay with Glass and in Articles Made in Accordance Therewith, of which the following is a specification.

Hitherto in the applying of a silicic coating to articles of different kinds various methods have been adopted. For example, for covering metal surfaces and for some forms of pottery coatings have been employed, which come properly under the term of "enamels," suitable mixtures, such as various metallic oxides and pure clay and other substances, being applied to the surface and then burned or baked on. The mixture is put on in a cold state and is set and fixed and becomes by the action of heat part of the substance of the article enameled. In other instances a glaze is formed on the surface of clay tiles and similar objects by sprinkling on the tiles previous to baking suitable mixtures, comprising, usually, common salt, whereby a silicic coating is formed on and it may be in part out of the substance of the tile, and, further, it is known that an imperfect clay when baked sufficiently may exude a suitable glaze upon the surface of the clay, due to the fact that the imperfections in the clay are fusible. A true clay absolutely pure will not give out a glaze, because it will not melt. It has also been known that molten glass will adhere with more or less tenacity to burnt clay—as, for instance, at the sides of pure clay retorts—but there has been prior to this invention no attempt made to utilize this principle in the arts. As a matter of fact, unless the process herein indicated as the subject of this invention be followed glass so adhering accidentally to clay objects has hitherto in cooling presented an apparently-useless structure so far as any ornamental or other purpose is concerned.

While our improved process is capable of a great variety of applications and may be carried out with widely-different apparatus, the accompanying drawings will serve to illustrate the invention.

In said drawings, Figure I is a top view of a glass-mold which may be used. Fig. II is a sectional view of the same with a brick or tile in place and the plunger raised. Fig. III is a perspective view. Fig. IV is an edge view, and Fig. V a perspective view, of bricks on which the process has been used. Fig. VI is a sectional view of a mold, showing a hollow tile therein. Figs. VII and VIII are sectional and perspective views of said tile.

The purpose of the present invention is to coat or plate clay objects—such as bricks, tiles, &c.—with glass, of any desired thickness and design in such manner that the plating shall be strong and free from cracks. To this end the bricks, tiles, or other objects $a$ are prepared of clay or clay composition, of such nature as to have substantially the same shrinkage in cooling as the particular glass employed for plating. It may be found that the composition of the clay would have to be altered according to the composition of the particular glass employed. The surface of the object which is to be coated may be plain or it may be molded or otherwise formed or provided with any suitable design. The brick or other object $a$ is prior to being coated heated to a high temperature. The coating $b$ of glass is then applied and compressed onto one or more faces of the brick or other object. In practice it has been found best to place the heated brick or other object $a$ in a suitably-shaped mold $c$, its sides projecting sufficiently above the brick to allow room for the molten glass and plunger $d$, and then to drop on the brick a suitable quantity of molten glass $b$, and by depression of the plunger spread the glass over the surface of the brick and cause it to adhere firmly to the brick. The brick is then removed from the press and placed in a suitable annealing oven or kiln and allowed to slowly cool, when it will be found to be coated with an even plate of glass, which firmly adheres to the brick and has an entire absence of cracks. Furthermore, the glass is found when applied to clay by this process to acquire great hardness, the action being apparently analogous to the chilling of iron.

With glass composed of three hundred pounds sand, two hundred pounds oxide of lead, one hundred pounds carbonate of potash, twenty pounds nitrate of potash, and one pound borax a clay composed of four parts of burnt pot-clay, three parts of raw pot-clay, and two parts of sand may be used as having substantially the same shrinkage; but in general the selection of the clay or clay composition to accord with the shrinkage of the glass employed must be left to the intelligence of the workman and his knowledge of the shrinkage of the particular articles he desires to use.

The under surface of the plunger $d$ employed may be altered at pleasure, so as to impart to the exterior surface of the glass plate any suitable design. Different-colored effects may be obtained by adding suitable coloring-matters to the glass or to the surface of the brick or tile under the glass plate, or to the composition of the brick or tile, or by any or all of these methods. A fine effect is produced by applying a main plating $b$ of clear or colored glass (see Fig. IV) and coating this with a thin film $e$ of glass of any selected color, which may be then cut or ground or engraved to impart any desired design or ornamentation. (See Fig. V.)

Where hollow or annular tiles or those in the shape of a square ring are made as shown in Figs. VI, VII, and VIII, the central aperture $f$ may be closed during the application of the plate $b$ by a supplementary block or die $g$, which may impart to the central portion of the plate any desired design or which may be perfectly plain.

The term "brick" or "tile" is employed in its most comprehensive sense to cover any similar article without regard to its shape or to the art or purpose for which it is employed.

Having thus described our invention, the following is what we claim as new therein and desire to secure by Letters Patent:

1. The process of manufacturing glass-plated bricks, tiles, and other articles, which consists in forming the article of clay or clay composition of approximately the same degree of contraction and expansion as the glass employed, raising the said article to a high temperature, applying to the surface to be coated glass in a molten condition, compressing the molten glass onto the surface of the brick, so that the under surface of the glass will adhere to the clay, and finally annealing the glass-plated article, substantially as set forth.

2. A brick or tile composed of clay or clay composition and glass compressed on the clay, said clay and glass being approximately of the same degree of contractibility and expansion, substantially as set forth.

3. A brick or tile composed of a body of clay or clay composition formed with an opening through it, such as $f$, and a glass plate compressed onto the face of said body and covering said opening, substantially as set forth.

ARTHUR A. HOUGHTON.
ROBERT D. HAINES.

In presence of—
E. D. MILLS,
GEO. T. SPENCER.